(12) United States Patent
Ryan et al.

(10) Patent No.: US 6,442,051 B1
(45) Date of Patent: Aug. 27, 2002

(54) FULL THYRISTOR BRIDGE CIRCUIT WITH FREE WHEELING DIODE FOR DE-EXCITATION CONTROL AND STABILITY SENSING

(75) Inventors: Michael John Ryan, Tarzana, CA (US); Mohammed Kassem Saleh, Casa Grande, AZ (US); Rodney Alen Lawson, Fincastle; John Earl Bittner, Troutville, both of VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/699,408

(22) Filed: Oct. 31, 2000

(51) Int. Cl.[7] ............................................... H02M 7/162
(52) U.S. Cl. ......................................... 363/87; 363/129
(58) Field of Search .............................. 363/85, 87, 88, 363/128, 129

(56) References Cited

U.S. PATENT DOCUMENTS

| | | |
|---|---|---|
| 3,702,962 A | 11/1972 | Wohr et al. |
| 4,146,921 A | 3/1979 | Akamatsu |
| 4,428,023 A | 1/1984 | Maier |
| 4,447,868 A * | 5/1984 | Turnbull ........................ 363/87 |
| 4,455,598 A * | 6/1984 | Andre ........................... 363/129 |
| 4,523,267 A * | 6/1985 | Mehl ............................. 363/87 |
| 4,598,353 A * | 7/1986 | Leuthen ....................... 363/129 |
| 4,725,941 A * | 2/1988 | Watanabe ..................... 363/87 |
| 4,757,435 A * | 7/1988 | Wood et al. .................. 363/129 |
| 4,815,052 A * | 3/1989 | Walker .......................... 363/87 |
| 5,528,444 A | 6/1996 | Cooke et al. |
| 5,528,445 A | 6/1996 | Cooke et al. |
| 5,574,635 A | 11/1996 | Phillippe |
| 5,574,636 A | 11/1996 | Lee et al. |
| 5,963,440 A * | 10/1999 | Gibbs et al. ................. 363/129 |

\* cited by examiner

*Primary Examiner*—Jeffrey Sterrett
(74) *Attorney, Agent, or Firm*—Karl Vick, Esq.; Kevin Duncan, Esq.; Hunton & Williams

(57) ABSTRACT

A circuit is provided for use in a synchronous generator excitation system. The circuit comprises a three-phase bridge having six legs. The bridge is connected with an AC power supply. A thyristor is provided in each of the six legs, wherein the thyristors provide a path for a device current. A free wheeling diode functions as a de-excitation means connected in parallel with the three-phase bridge. The free wheeling diode provides a discharge path for a field current.

24 Claims, 13 Drawing Sheets

FULL THYRISTOR BRIDGE CIRCUIT WITH FREE WHEELING DIODE FOR DE-EXCITATION CONTROL AND STABILITY SENSING

FIELD OF THE INVENTION

The present application relates to an apparatus for converting AC voltage to a variable DC voltage for exciting the rotating field of a synchronous generator.

BACKGROUND OF THE INVENTION

It has been common practice to use a full thyristor bridge circuit to convert AC voltage to a variable DC voltage for exciting the rotating field of a synchronous generator. A typical example of such a full thyristor bridge circuit is shown in FIG. 2. The full thyristor bridge circuit 100 includes six thyristors 101–106 that are connected with an AC power supply 125. A de-excitation circuit 127 is provided at the output of the thyristors 101–106 and is controlled by either a field discharge circuit breaker or an AC or DC breaker with a thyristor discharge device to reliably discharge the generator field 130.

The full thyristor bridge circuit 100 shown in FIG. 2 includes many functional advantages such as the ability to transiently invert field voltage to rapidly decrease generator field flux linkages. Additionally, the full thyristor bridge circuit 100 has an output voltage that can easily be linearized with respect to firing angle. However, the full thyristor configuration also suffers from the disadvantage that it is costly due in part to the need to interface with both AC and DC breakers and the need to fire a de-excitation thyristor within the de-excitation circuit.

In order to provide a more cost-effective alternative to the full thyristor bridge 100, the hybrid bridge circuit 200, shown in FIG. 3, was developed. The hybrid bridge circuit 200 is suitable for applications in which response of the circuit is less critical than cost. Instead of the six thyristors 101–106 of the full thyristor bridge circuit 100, the hybrid bridge circus 200 includes three thyristors 101–103 and three diodes 151–153. A free wheeling diode 121 is connected across the output of the thyristors 101–103 and diodes 151–153. Replacing three of the thyristors with diodes reduces circuit cost. The hybrid bridge circuit 200 does provide the ability to de-excite the generator field 130, but has several undesirable effects. First, the hybrid bridge circuit 200 is subject to "latch up" where a rapid phase back can lead to a condition where the output voltage goes to about two thirds of ceiling or maximum voltage and will not recover with normal control action. Compensating for latch up requires extra control circuitry or firing circuit limits that don't permit large firing angles. Restricting large firing angles limits the low voltage capability of the circuit and makes the circuit unusable if the ceiling voltage is high. Additionally, the hybrid bridge circuit output voltage as a function of firing angle deviates significantly from the full thyristor bridge circuit characteristic output voltage. Furthermore, the hybrid bridge circuit 200 generates line current harmonics that contain even harmonics. With the hybrid bridge circuit 200, current is maintained in the free wheeling diode 121 at a full load on the generator with normal ceiling voltages of 1.6 times generator full load voltage, a common specification. Furthermore, common mode voltage characteristics of a hybrid bridge are very different from those of a full thyristor bridge and have necessitated the use of special filter circuits to remove the effects of the common mode voltage.

In view of the deficiencies described above in the hybrid bridge circuit, a cost effective alternative to the full thyristor bridge circuit is needed that doesn't have the deficiencies of the hybrid bridge circuit.

SUMMARY OF THE INVENTION

In accordance with the purpose of the invention as embodied and broadly described herein, there is provided a circuit for use in a synchronous generator excitation system, the circuit comprising: a three-phase bridge having three legs; means for connecting the three-phase bridge with an AC power supply; a thyristor in each of the three legs; and a de-excitation means connected in parallel with the three-phase bridge. The de-excitation means comprises a discharge path including free wheeling diode positioned to provide a discharge path for a field current.

In an additional embodiment of the invention, a circuit for use in a synchronous generator excitation system is provided. The circuit comprises a three-phase bridge having three legs and means for connecting the three-phase bridge with an AC power supply including a transformer. The circuit further comprises a thyristor in each of the three legs, wherein the thyristors provide a path for a device current. A de-excitation means is connected in parallel with the three-phase bridge. The de-excitation means comprises a discharge path including a free wheeling diode positioned to provide an automatic discharge path for a field current when a field voltage polarity reverses, wherein insubstantial current flows through the free wheeling diode until substantially all inductive energy of the transformer is depleted.

In yet an additional embodiment, the invention comprises a method for converting an AC voltage to a DC voltage using six thyristors forming a three-phase bridge and a free wheeling diode de-excitation mechanism connected in parallel with the three-phase bridge. The method comprises providing an AC power supply, triggering the thyristors when the AC power supply provides a positive voltage, and upon reversal of voltage polarity, automatically causing the free wheeling diode to conduct.

In yet an additional embodiment, the invention comprises a method for converting an AC voltage to a DC voltage using six thyristors forming a three-phase bridge and a free wheeling diode de-excitation mechanism connected in parallel with the three-phase bridge. The method comprises providing an AC power supply, triggering the thyristors when the AC power supply provides a positive voltage, and upon reversal of voltage polarity, depleting the inductive energy of a transformer associated with the power supply thereby causing a substantial portion of generator field current to discharge through the free wheeling diode, wherein after polarity reversal and prior to transformer discharge, an insubstantial current discharges through the free-wheeling diode.

The aforementioned embodiments and similar embodiments provide a low cost alternative to the full thyristor bridge circuit without all of the disadvantages of the hybrid bridge circuit. While the ability to transiently invert field voltage is not maintained by the apparatus of the invention, many other desirable characteristics of the full thyristor bridge circuit are maintained. The circuit of the invention is capable of reliable de-excitation and can be used with AC or DC breakers without the need for coordination with control. In contrast to the hybrid bridge circuit, the bridge circuit of the invention does not suffer from latch up and does not generate even line current harmonics. Line current harmonics at full load are the same as with the full thyristor bridge circuit. Furthermore, the bridge circuit of the invention has common mode voltage characteristics that are very similar to those of the full thyristor bridge circuit.

These and other features, objects, and advantages of the preferred embodiments will become apparent when the detailed description of the preferred embodiments is read in conjunction with the drawings attached hereto.

DETAILED DESCRIPTION

Figure 1:
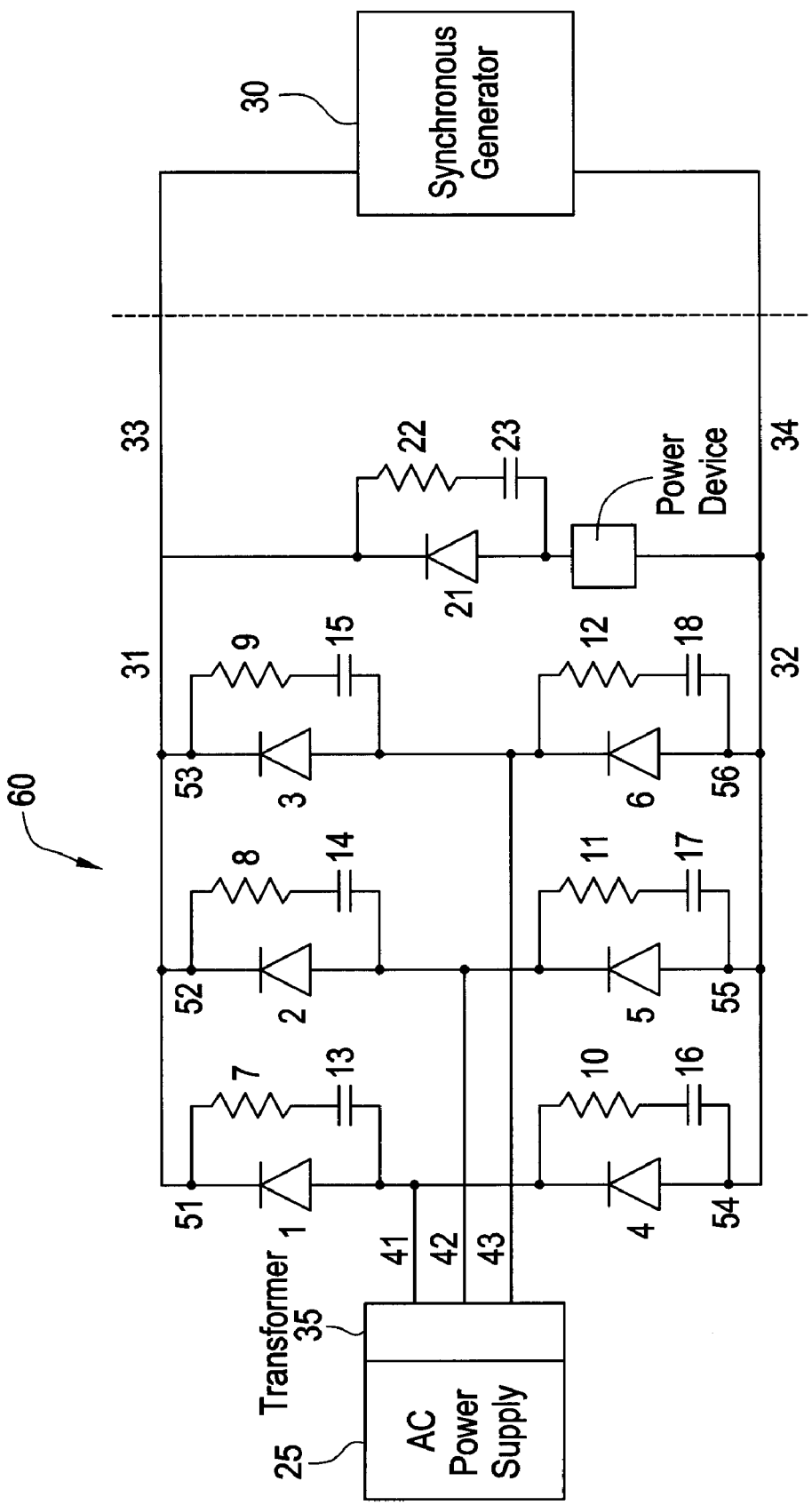
FIG. 1 is a circuit diagram illustrating an embodiment of the bridge circuit of the invention.

Reference will now be made in detail to the present preferred embodiments of the invention, examples of which are illustrated in the accompanying drawings in which like reference numerals refer to corresponding elements.

A circuit of an embodiment of the invention is shown in FIG. 1. The circuit 60 includes thyristors 1–6. Power is supplied to thyristors 1–6 by AC power supply 25 through lines 41, 42, and 43. The AC power supply 25 includes a transformer 35 as is known to those skilled in the art. Associated with each thyristor 1–6 is a resistor 7–12 and a capacitor 13–18. Each thyristor and its associated resistor and capacitor occupy corresponding legs 51–56 of the circuit 60. Connected in parallel across the output of thyristors 1–6 is a free wheeling diode 21. A free wheeling diode can be defined as a diode connected across the controlled bridge of a static excitation system to provide a path for current to flow if the normal bridge path is not available, The aforementioned components are connected through lines 33 and 34 with generator field 30. Not shown is the three phase AC breaker and/or DC contractor/breaker required for an actual exciter implementation. The circuit 60 may further include a detection device 65 and a synchronous generator 30.

In operation, assuming that the AC power supply provides a voltage $V_S = E^* \sin(wt)$, then $V_S$ is positive when $0 < wt < \pi$ and $V_S$ is negative when $\pi < wt < 2\pi$. A thyristor can only be triggered when the AC voltage across it is positive. For the A phase positive thyristor 1 this only occurs when $V_{AC}$ is positive, where $V_{AC}$ is the voltage of phase A with respect to phase C, thus there is 180 degree interval over which the A phase positive thyristor can be triggered. Similar relationships occur for the other thyristors 2–6 with full phase control requiring firing angles that vary over a 180 degree interval. When any of thyristors 1–6 is triggered at $wt = \alpha$, then $\alpha$ is called the firing angle.

Figure 2:
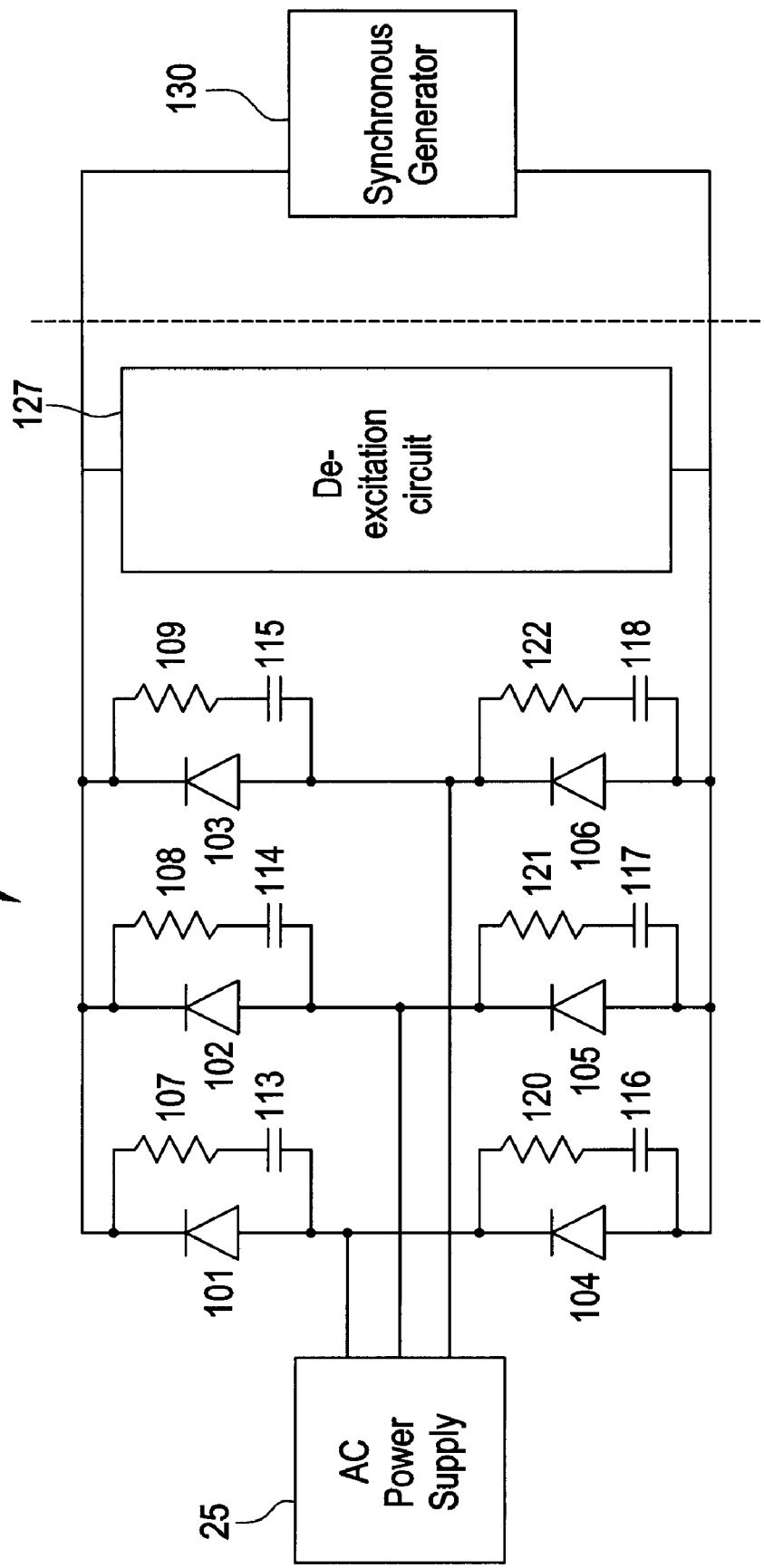
FIG. 2 is a circuit diagram illustrating a typical full thyristor bridge circuit.
Figure 3:
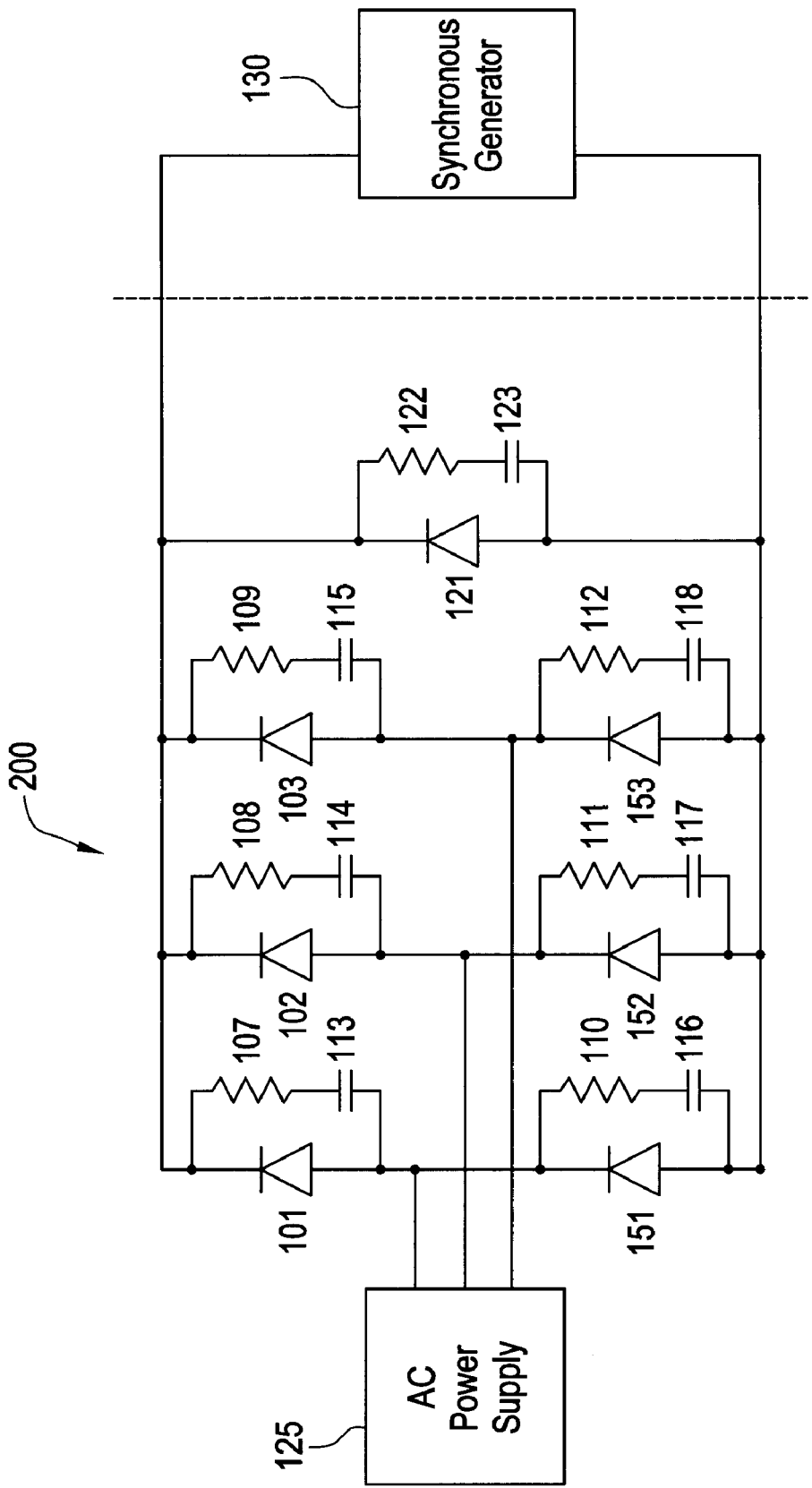
FIG. 3 is a circuit diagram illustrating a typical hybrid bridge circuit configuration.
Figure 4:
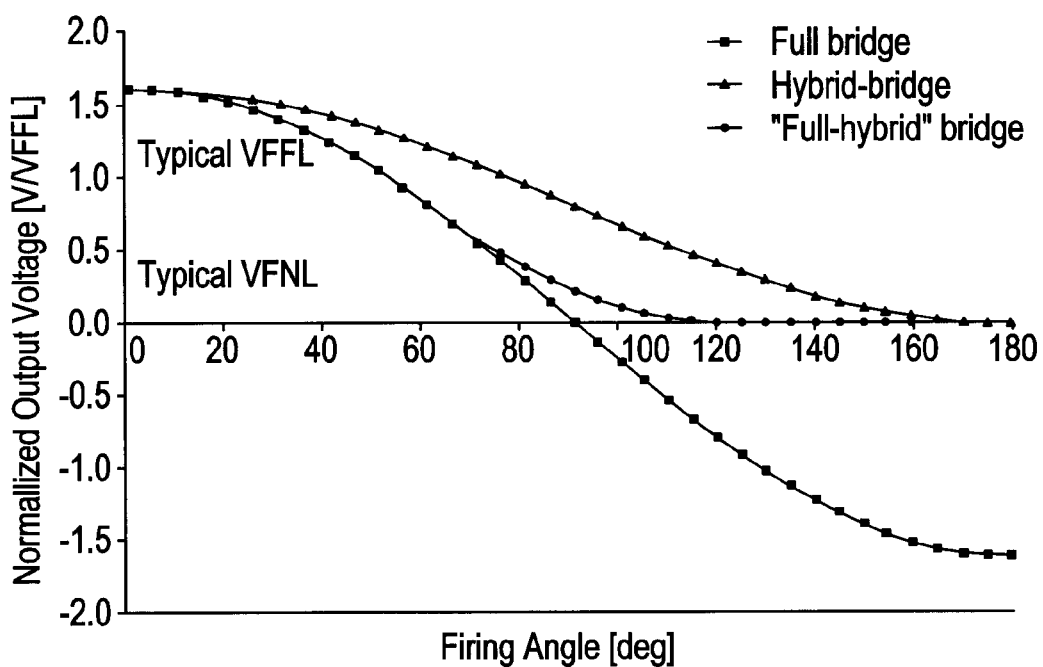
FIG. 4 is a graph illustrating normalized output voltage vs. firing angle for the full bridge circuit, the hybrid bridge circuit, and an embodiment of the bridge circuit of the invention.

The thyristors 1–6 are forward biased but remain in a blocking state until triggered by firing circuits (not shown). When triggered, the thyristors 1–6 start conducting and remain conducting until after the voltage $V_{AC}$ reverses polarity and the current in the inductance of the transformer associated with the power supply 25 is forced to substantially zero. Unlike the full thyristor bridge (FIG. 2), when the field voltage in FIG. 1 reverses polarity, the free wheeling diode 21 begins to conduct. However, the current in the free wheeling diode 21 is insubstantial until the current in the inductance of the transformer is depleted during which time the bridge thyristor current is gradually reduced. FIG. 4 illustrates the relationship between output voltage $V_{dc}$ and firing angle $\alpha$ for the full thyristor bridge circuit, the hybrid bridge circuit and the bridge circuit of the invention respectively. In general the output voltage of a full thyristor bridge circuit is $$V_{dc} = V_{13} \text{ ceiling}^* \cos(\alpha) \tag{1}$$

The output voltage for the circuit 60 of an embodiment of the invention conforms to equation (1) for $\alpha \leq 60$ degrees. At firing angles $\alpha$ larger than 60 degrees, the output voltage $V_{dc}$ of the bridge circuit 60 becomes $$V_{dc} V \text{ ceiling } (1 + \cos(\alpha + 60)). \tag{2}$$

The free wheeling diode 21 does not conduct until α exceeds 60 degrees. At this point, the output of the bridge tries to reverse. Significant current does not flow through the free wheeling diode 21 until α is greater than 70 degrees because of the energy stored in the inductance of the power supply 25 associated with the transformer.

The output voltage of the circuit of the invention does not experience significant deviation from the output voltage of the known full thyristor bridge circuit up to about 80 degrees where Vdc=V_ceiling*(1+cos(α+60)). As shown in FIG. 4, the bridge circuit 60 has an output voltage $V_{dc}$ that more closely mirrors that of the full thyristor bridge circuit than the hybrid bridge circuit does.

The output voltage $V_{dc}$ of the hybrid bridge circuit displays the relationship:

$$V_{dc}=V\_\text{ceiling}*(1+\cos(\alpha))\backslash 2 \quad (3)$$

throughout the spectrum of firing angles α. As is shown in FIG. 4, the output voltage $V_{dc}$ of the hybrid bridge differs from that of the full thyristor bridge for almost the entire range of firing angles α.

The bridge circuit 60 is not subject to latch-up conditions described above in connection with the hybrid bridge circuit. Accordingly it is not necessary to limit the firing angle and control can be maintained down to zero output volts. Furthermore, the bridge circuit 60 has no free wheeling diode current at generator full load with normal ceiling voltages of 1.6 times generator full load field voltage. Line current harmonics at generator full load are therefore the same as with a full thyristor bridge circuit. At lower generator field voltages, the line current harmonics exist at a fundamental frequency and at 6*n+/−1 times the fundamental frequency just as with the full thyristor bridge circuit. Harmonic currents for operation at firing angles above 60 degrees are larger than for the full thyristor bridge circuit, but the total current is less at these operating conditions. Operation at firing angles below 60 degrees is identical to the operation of the full thyristor bridge circuit.

Figure 5:
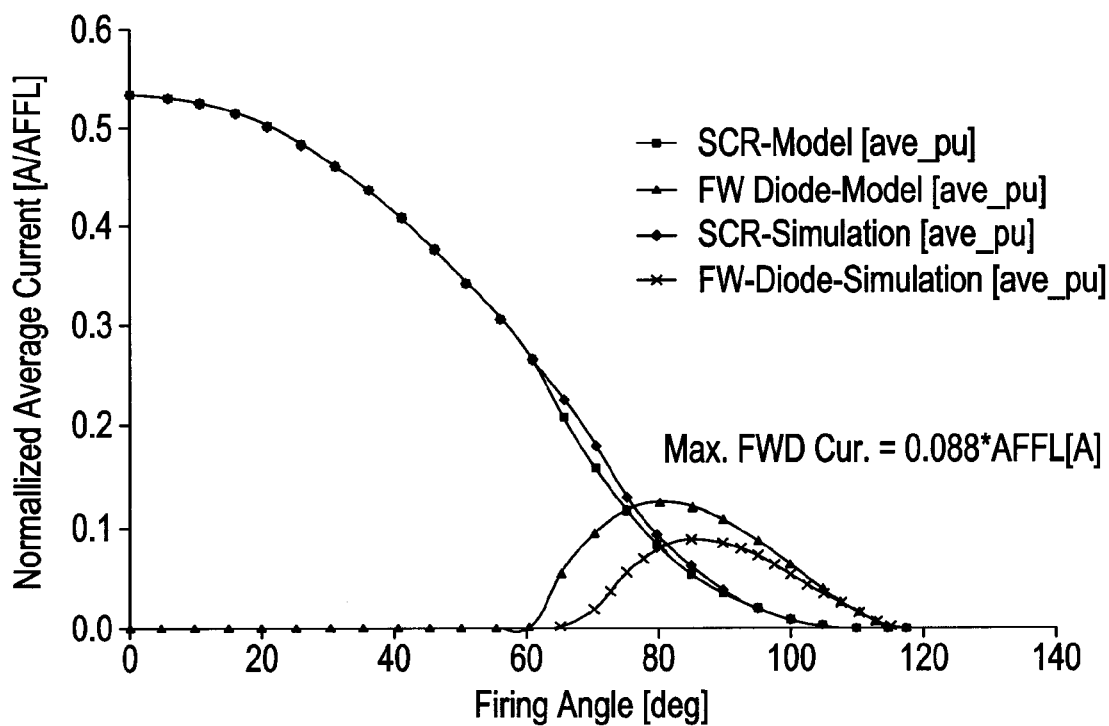
FIG. 5 is a graph illustrating average device current (the bridge thyristor currents and the free wheeling diode current) vs. firing angle for an embodiment of the bridge circuit of the invention.

FIG. 5 plots the free wheeling diode current over a range of firing angles α with an input transformer designed for a ceiling voltage of 1.6 times the generator full load field voltage and a transformer impedance of 6%. FIG. 5 also illustrates the current through the thyristors 1–6 as well as the current through the free wheeling diode 21 both in an idealized model and in an actual simulation. As the firing angle α increases from zero, the current through the thyristors 1–6 decreases. At a firing angle α of about sixty-five to seventy degrees, significant current begins to flow through the free wheeling diode 21 and peaks between firing angles of between about 80 and 90 degrees. Between this firing angle and a firing angle of about 120°, both the current through the thyristors 1–6 and the free wheeling diode 21 continue to decrease until reaching zero.

Figure 6:
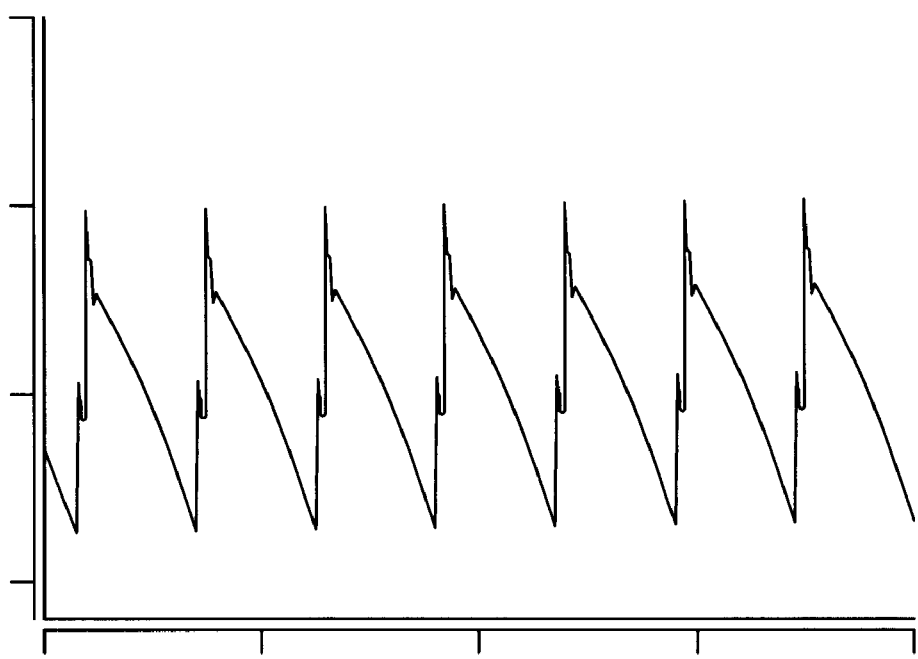
FIG. 6 is a graph illustrating an exemplary output voltage waveform at VFFL for an embodiment of the bridge circuit of the invention, where VFFL (Volts Field at Full Load) is the field voltage of the generator at rated load, rated power factor and with the field at rated temperature.

FIG. 6 depicts the output voltage waveform of the circuit of the present invention at VFFL operation. The waveform shown is substantially identical to that of the full thyristor bridge and operation results in the same line current harmonics and common mode voltage.

Figure 7:
FIG. 7 is a graph illustrating an exemplary line current at VFFL for an embodiment of the bridge circuit of the invention.
Figure 8:
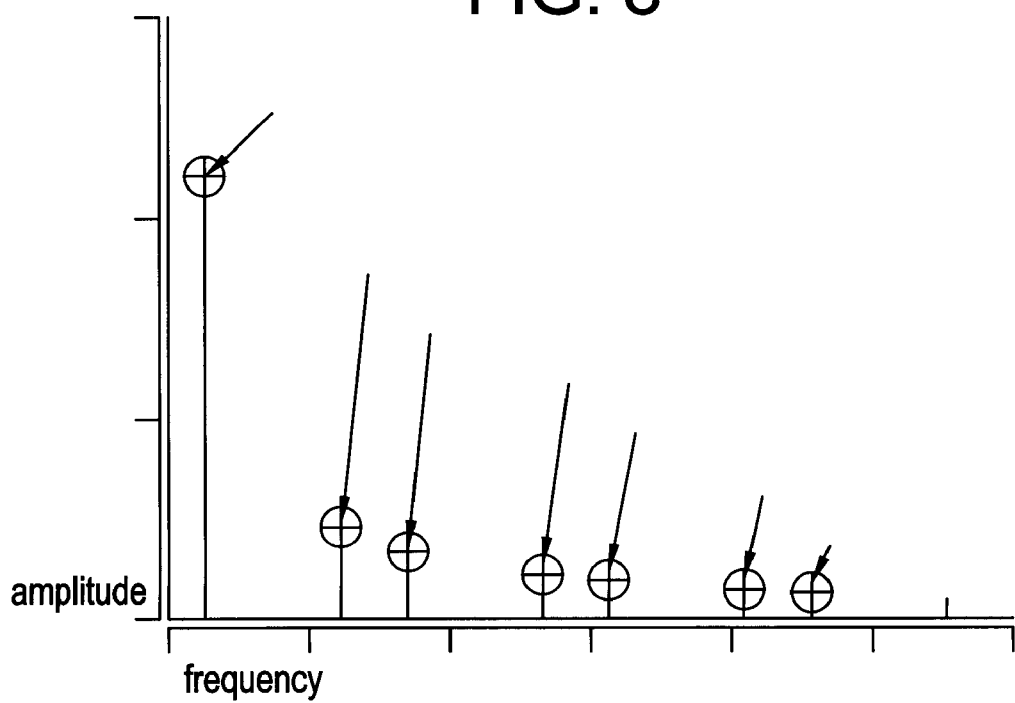
FIG. 8 is a graph illustrating a line current spectrum at VFFL for an embodiment of the bridge circuit of the invention.

FIGS. 7 and 8 depict the line current and the harmonics respectively of the bridge circuit 60 of an embodiment of the invention. As set forth above, the bridge circuit 60 introduces line current harmonics at the fundamental frequency and at 6*n+/−1 times the fundamental frequency, similar to those of the well known full thyristor bridge circuit. Accordingly, even current harmonics are substantially eliminated. In FIG. 8, the x-axis represents frequency in Hz and the y-axis represents amplitude. The circles are indicative of the magnitude of the harmonics of the currents. The lines point to the circles and give the frequency and amplitude of the particular harmonic. The first line points to a frequency of 60.0 and an amplitude of 2201.3. The second line points to a frequency of 300.0 and an amplitude of 441.17. The third line points to a frequency of 420.0 and an amplitude of 313.3. The fourth line points to a frequency of 660.0 and an amplitude of 199.51. The fifth line points to a frequency of 780.0 and an amplitude of 166.11. The sixth line points to a frequency of 1020.0 and an amplitude of 126.88 and the seventh line points to a frequency of 1140.0 and an amplitude of 109.9.

Figure 9:
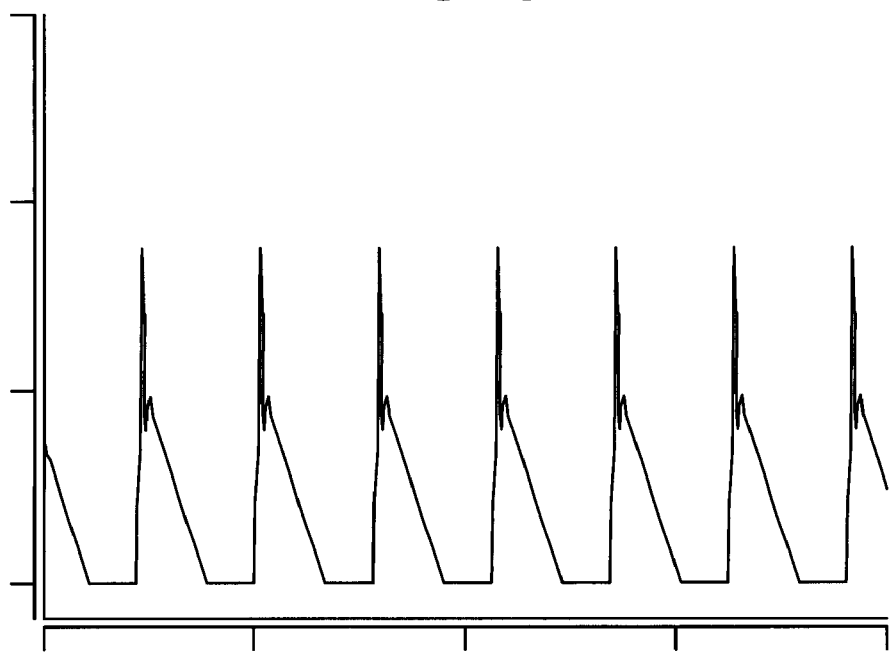
FIG. 9 is a graph illustrating output voltage at VFNL for an embodiment of the bridge circuit of the invention where VFNL (Volts Field at No Load) is the field voltage of the generator at rated terminal voltage, off line at rated speed and with the temperature of the field at 25 degrees C.
Figure 10:
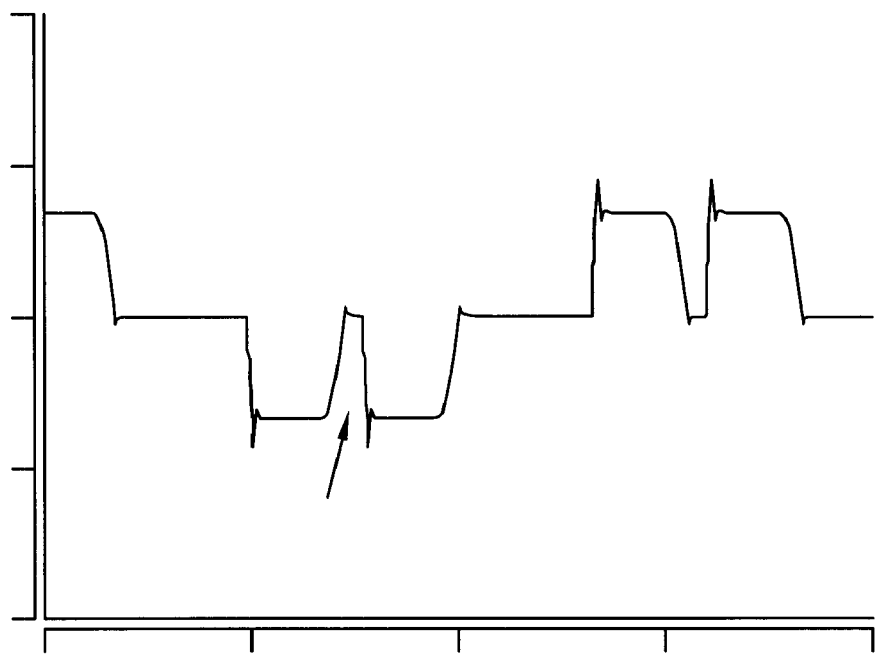
FIG. 10 is graph illustrating line current at VFNL for an embodiment of the bridge circuit of the invention.
Figure 11:
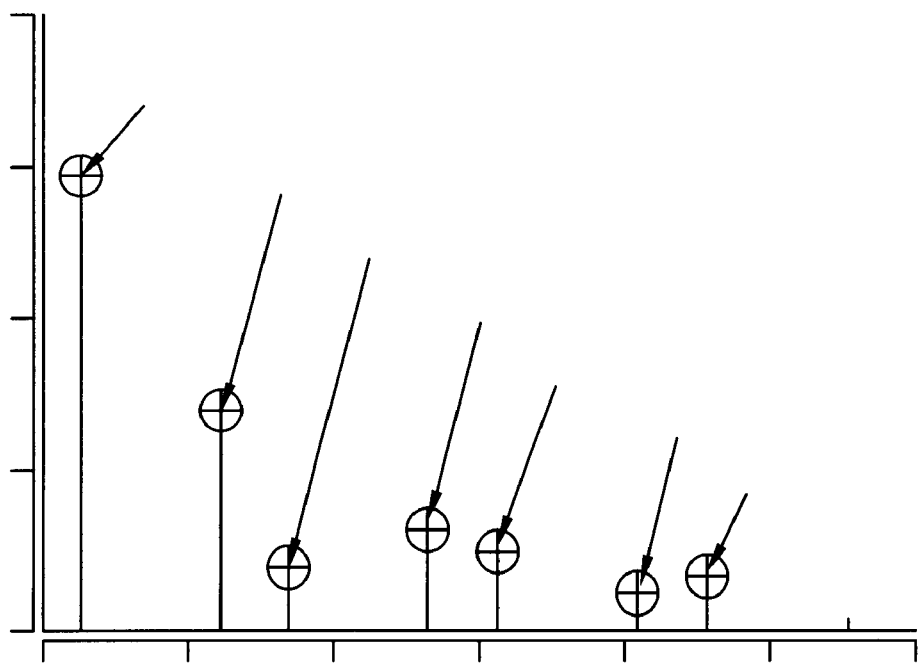
FIG. 11 is a graph illustrating the line current spectrum at VFNL for an embodiment of the bridge circuit of the invention.

FIGS. 9–11 depict the operation of the bridge circuit 60 at VFNL. As set forth above, significant current does not flow in the free wheeling diode 21 until firing angles α of greater than about 70 degrees are reached because of the inductance of the transformer feeding the bridge. At a firing angle of 60 degrees, the output of the bridge tries to reverse causing the free wheeling diode 21 to conduct. Current in the free wheeling diode 21 can only conduct the generator field current given up by the two thyristors that are conducting. For firing angles greater than 60 degrees, a line to line voltage is impressed across twice the transformer inductance, the two conducting thyristors and the free wheeling diode 21. Since this voltage always starts at zero volts, the commutation of the current is not abrupt and results in a smooth transition of the current from the thyristors 1–6 to the free wheeling diode 21. With regard to FIG. 11, the frequency of the first harmonic in 60.0 and its amplitude is 578.35. The frequency of the second harmonic is 300.0 and its amplitude is 270.09. The frequency of the third harmonic is 420.0 and its amplitude is 73.179. The frequency of the fourth harmonic is 660.0 and its amplitude is 121.33. The frequency of the fifth harmonic is 780.0 and its amplitude is 94.337. The frequency of the sixth harmonic is 1020.0 and its amplitude is 39.619. The frequency of seventh harmonic is 1140.0 and its amplitude is 63.107.

Figure 12:
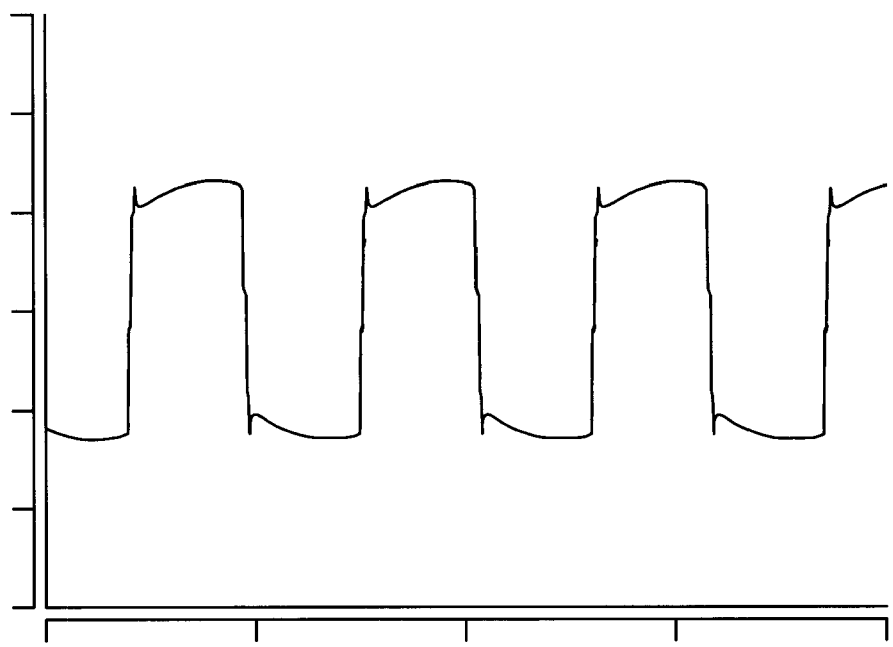
FIG. 12 is a graph illustrating virtual common mode voltage of the full thyristor bridge circuit at VFNL.
Figure 13:
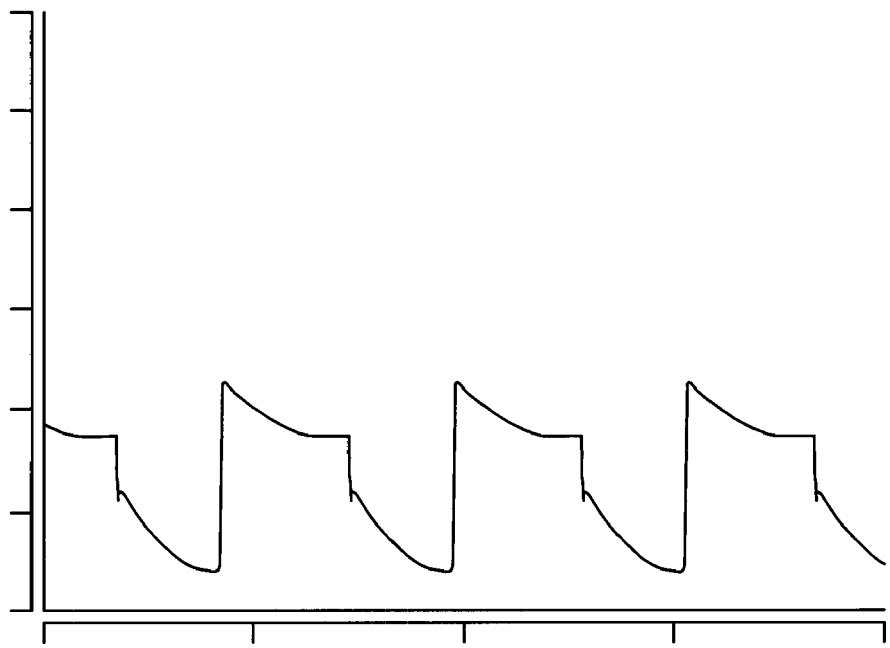
FIG. 13 is a graph illustrating virtual common mode voltage of the hybrid bridge circuit at VFNL.
Figure 14:
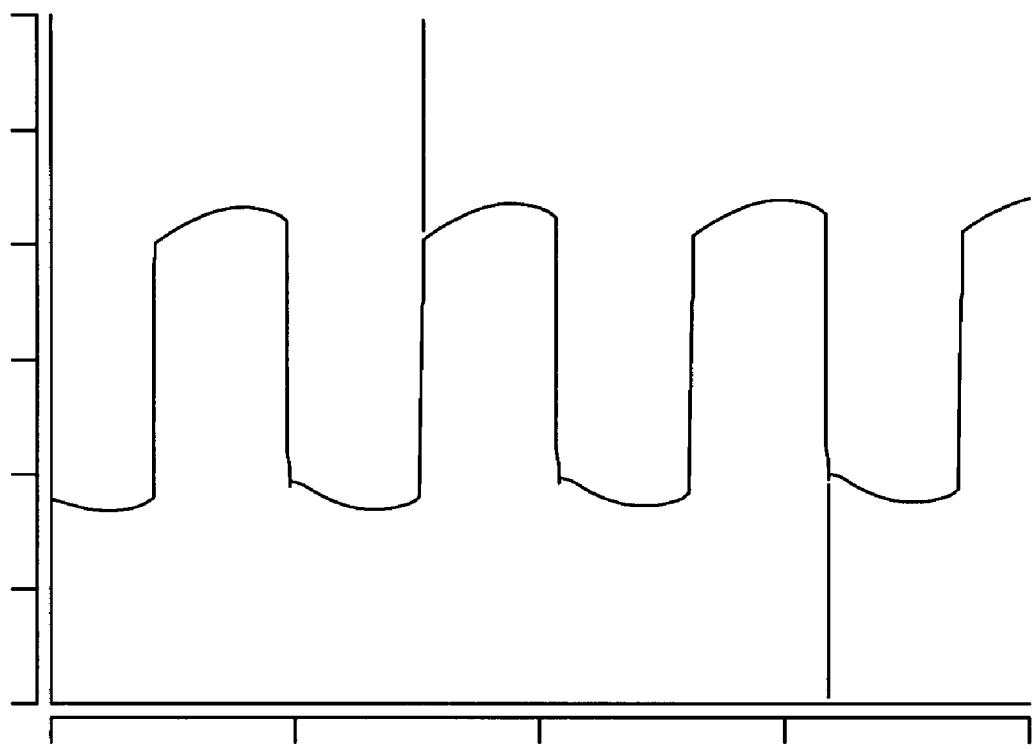
FIG. 14 is graph illustrating virtual common mode voltage of an embodiment of the bridge circuit of the invention at VFNL.

FIGS. 12, 13 and 14 illustrate common mode voltage characteristics for the full bridge circuit, the hybrid bridge circuit, and the bridge circuit 60 of an embodiment of the invention respectively. As shown, the common mode voltage characteristics of the bridge circuit 60 are very similar to those of the full thyristor bridge circuit and therefore it is not necessary to use a different common mode filter circuit for the proposed invention. Common mode voltage is the voltage that is applied to both the positive and negative field leads and is subsequently coupled through distributed capacitance to the generator shaft, thereby creating a voltage from shaft to ground that can damage bearings.

Generally, bridge gain in the full thyristor bridge circuit is linearized by the use of an inverse cosine function. This is a software function residing in the firing control which is not shown. In the bridge circuit 60, two different functions are required for the different ranges of firing angles. If (Vdc/V_ceiling≧0.5), then the standard inverse cosine function can be used as follows:

$$\alpha = \text{inverse cosine } (V_{dc}/V\_\text{ceiling}) \quad (4)$$

For Vdc/V_ceiling<0.5, the firing angle should be computed as $$\alpha = \text{inverse cosine}((V_{dc}/V\_\text{ceiling})-1)-60) \quad (5)$$

This results in a linear bridge gain of V_ceiling/max_command, where max_command is the maximum commanded value of 1.0 from either the field voltage regulator (FVR) or field current regulator (FCR), (not shown).

Figure 15A:
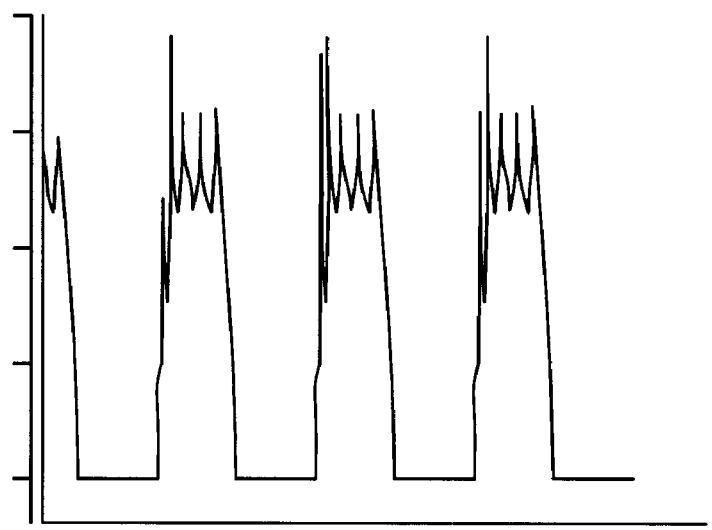
FIG. 15 is a graph illustrating output voltage and firing angle for an embodiment of the bridge circuit of the invention during an unstable operation.
Figure 15B:
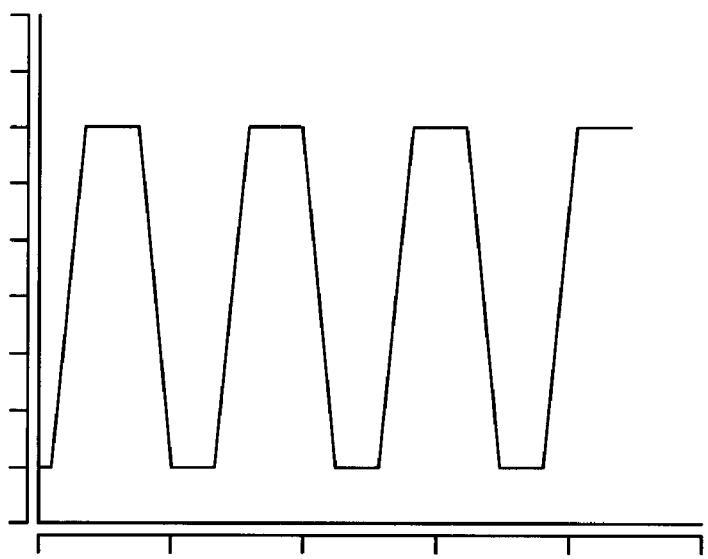
Figure 16A:
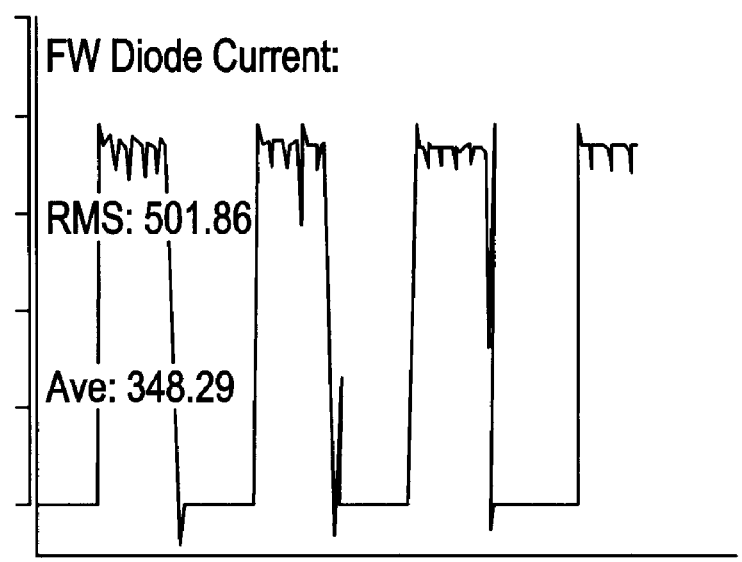
FIG. 16 is a graph illustrating the free wheeling diode current and the bridge output current for an embodiment of the bridge circuit of the invention during an unstable operation.
Figure 16B:
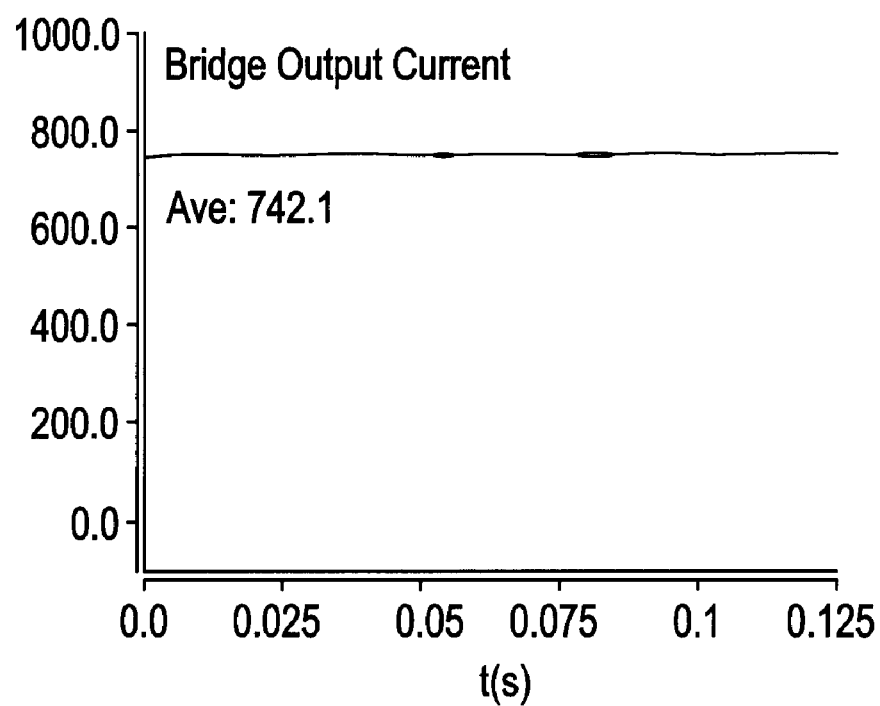

FIGS. 15 and 16 illustrate operation of the circuit during a failure mode in which gain is excessive and results in the control oscillating between its minimum and maximum firing angles (positive and negative ceiling voltages) while continuing to produce desired field current. This failure mode usually results from control failure or incorrectly adjusted limits. This failure mode is difficult to detect and usually continues until the load on the generator is reduced or a limit is exceeded. However, an embodiment of the bridge circuit 60 of the invention provides a mechanism for detecting this unstable condition and tripping the generator. During normal operation of the circuit, current in the free wheeling diode 21 is at maximum a small fraction of the generator field current (generally less than 12% of the average field current). During unstable operation, where the circuit is operated in the mode described herein, the average diode current can go to about 35% of the field current as depicted in FIGS. 15 and 16. By either monitoring the heat sink temperature with a thermally sensitive switch (not shown) or measuring the free wheeling diode current and modeling the thermal characteristics of the cell and heatsink, the unstable mode can be detected.

Figure 17:
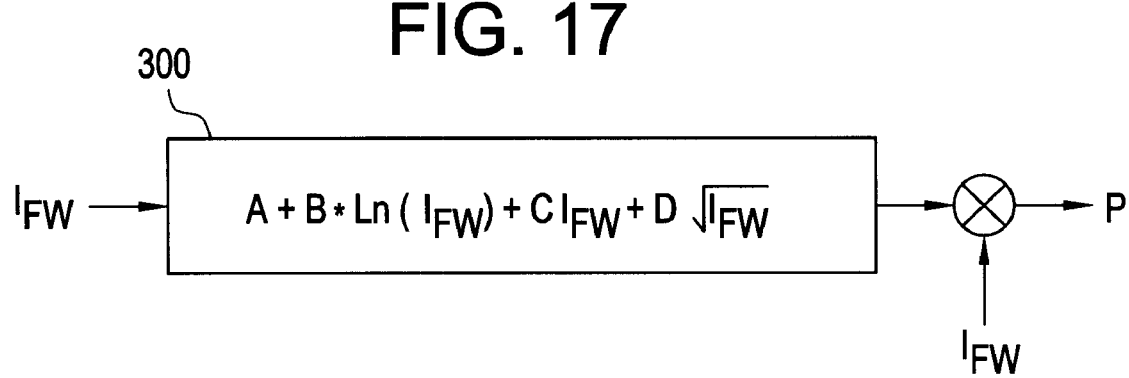
FIG. 17 is a block diagram illustrating calculation of instantaneous power in a power semiconductor.
Figure 18:
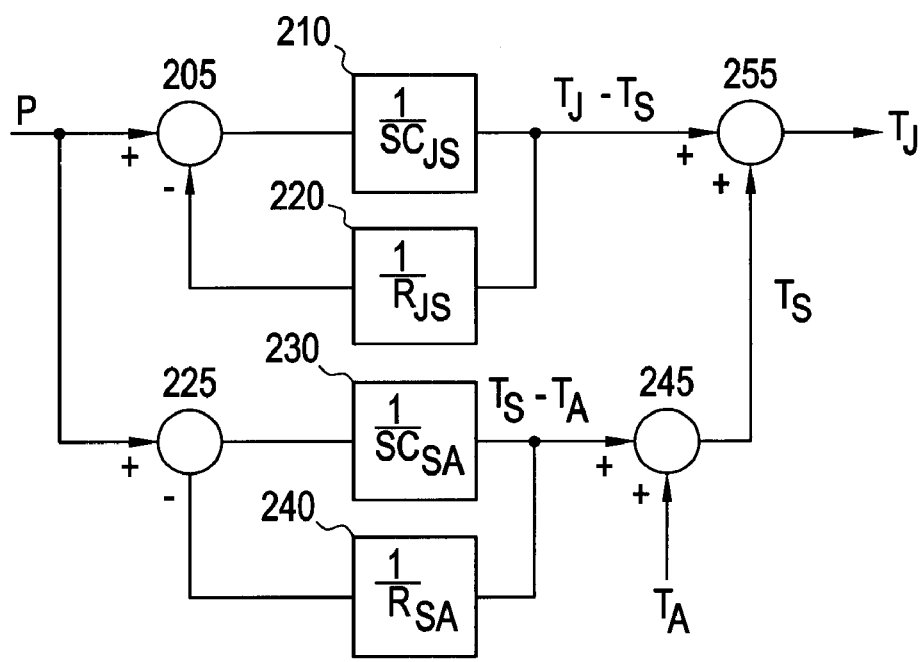
FIG. 18 is an analog diagram illustrating a method for calculating the junction temperature of the free wheeling diode as a function of measured diode current.

FIGS. 17 and 18 show a possible analog block diagram for calculating the junction temperature of the free wheeling diode. As shown in FIG. 17, $I_{fw}$ (the free wheeling diode current) can be measured using a shunt (not shown) or other appropriate method and is converted to power by the non-linear box 300 shown in FIG. 17. The nonlinear box converts $I_{fw}$ to power using the equation:

$$A+B \ln(I_{fw})+CI_{fw}+D\sqrt{I_{fw}} \qquad (6)$$

where A, B, C, and D are constants and $I_{fw}$ is the free wheeling diode current. The voltage developed across the diode is then multiplied by the free wheeling diode current $I_{fw}$ to yield instantaneous power developed in the junction of the diode.

FIG. 18 is an analog block diagram showing the development of the junction temperature $T_J$ of the free wheeling diode 21 using the equations shown in boxes 210, 220, 230 and 240. In the equations, "S" represents a Laplace operator, "C" represents a thermal storage device modeled electrically as a capacitor, and "R" represents thermal resistance. The subscript "JS" means junction to heat sink and the subscript "SA" represents heat sink to ambient. $T_J$ represents junction temperature, $T_S$ represents heat sink temperature, and $T_A$ represents ambient temperature. Accordingly, the parameters shown in boxes 210, 220, 230, and 240 are combined using the mathematical operations shown in 205, 225, 245, and 255 to arrive at the junction temperature $T_J$.

Figure 19:
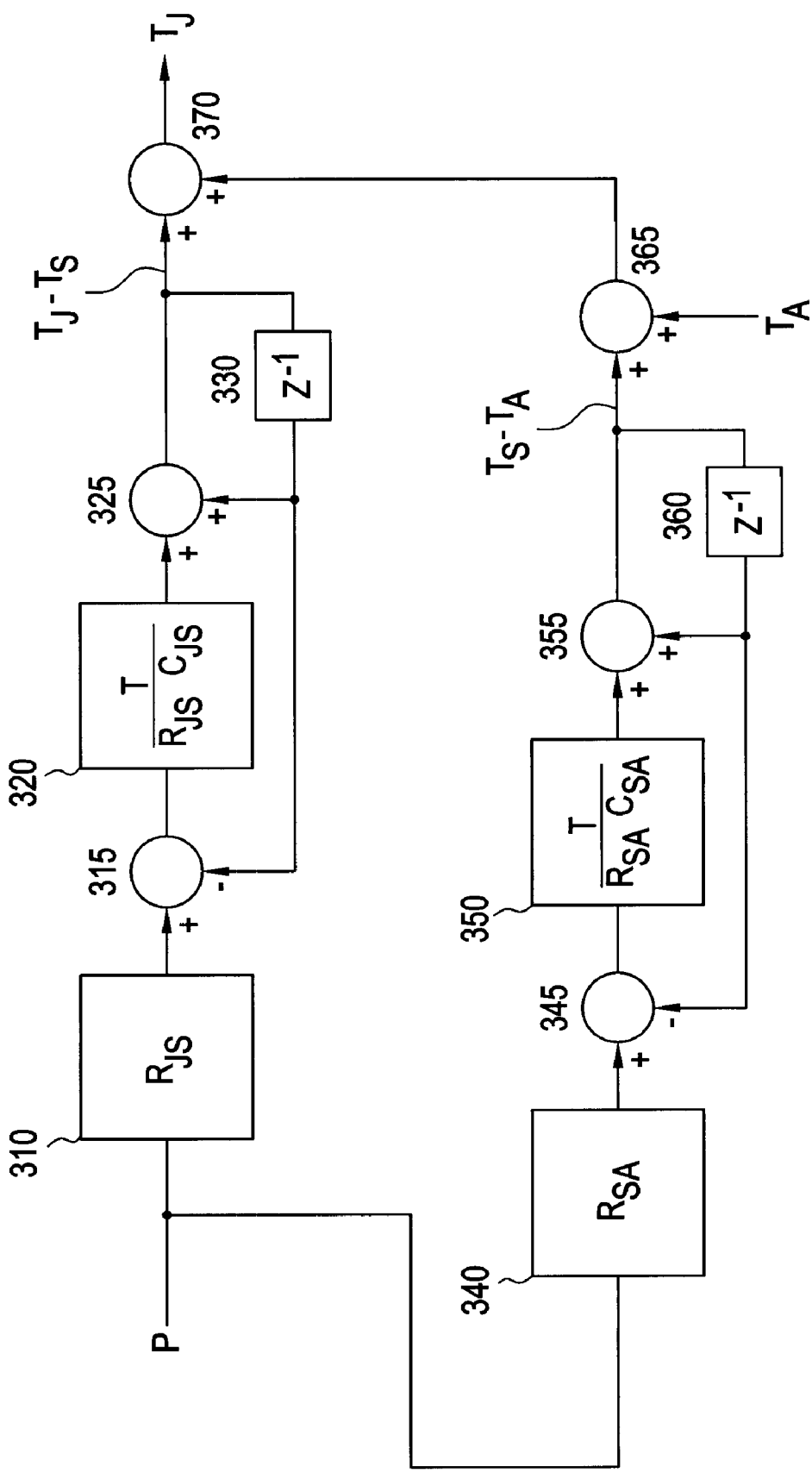
FIG. 19 is a digital block diagram illustrating a method for calculating the junction temperature of the free wheeling diode as a function of measured diode current.

FIG. 19 shows a possible digital implementation for developing the junction temperature $T_J$ of the diode. FIG. 19 obtains the instantaneous power P as described above in reference to FIG. 17. The symbols described above in reference to FIG. 18 have the same meanings in FIG. 19. Additionally, "T" in the block diagram is the sample time of the digital process while $Z^{-1}$ is a delay of one sample. In practice, the ambient temperature $T_A$ can be measured or assumed to be at the maximum design value. Accordingly, box 310 represent the thermal resistance from junction to heat sink and box 340 represents the thermal resistance from heat sink to ambient. Similarly, boxes 320 and 350 represent time T divided by the product of the above identified resistances and the corresponding capacitance $C_{JS}$ and $C_{SA}$. Boxes 330 and 360 represent the delay $Z^{-1}$. $T_J-T_S$ is reached as shown in FIG. 19 through combining the parameters described above in reference to boxes 310, 320, and 330 using the mathematical operations shown as 315 and 325. $T_S-T_A$ is reached through combining the parameters described above with references to boxes 340, 350, and 360 using the mathematical operation shown as 345 and 355 and is added at 365 to the ambient temperature $T_A$. The sum of these quantities is the junction temperature $T_J$ calculated at 370. This circuit would be equally effective for the hybrid bridge implementation but not for the full thyristor bridge.

While the hybrid bridge circuit was produced to effect cost savings, it may not be immediately clear that the bridge circuit 60 creates cost savings. Six thyristors are used, just as in the full thyristor bridge circuit. However, de-excitation is controlled with ease using only a free wheeling diode without any additional components that add expense. Furthermore, complications associated with the hybrid bridge circuit are unexpectedly avoided.

It will be apparent to those skilled in the art that various modifications and variations can be made in the system and method of the present invention without departing from the spirit and scope of the invention. Thus, it is intended that the present invention cover the modifications and variations of this invention provided that they come within the scope of the appended claims and their equivalents.

What is claimed is:

1. A circuit for use in a synchronous generator excitation system, the circuit comprising:
   a three-phase bridge having three legs, the three-phase bridge being connectable with an AC power supply;
   a first thyristor and a second thyristor in each of the three legs, wherein the first thyristor and the second thyristor provide a path for a device current:
   a de-excitation means connected in parallel with the three-phase bridge, the de-excitation means comprising a discharge path including a free wheeling diode positioned to provide a discharge path for a field current; and
   means for detecting an unstable mode of operation comprising means for calculating the junction temperature of the free wheeling diode.

2. A circuit for use in a synchronous generator excitation system, the circuit comprising:
   a three-phase bridge having three legs, the three-phase bridge being connectable with an AC power supply including an inductive device, and being adapted to provide a variable voltage output;
   a first thyristor and a second thyristor in each of the three legs, wherein the first thyristor and the second thyristor provide a path for a device current; and
   a de-excitation means connected in parallel with the three-phase bridge, the de-excitation means comprising a discharge path including a free wheeling diode positioned to provide an automatic discharge path for a field current when field voltage polarity reverses, wherein insubstantial current flows through the free wheeling diode until substantially all inductive energy of the inductive device is depleted.

3. The circuit of claim 2, wherein substantial current flows through the free wheeling diode at a firing angle of greater than seventy degrees.

4. A method for converting an AC voltage to a DC voltage using six thyristors forming a three-phase bridge and a free wheeling diode de-excitation mechanism connected in parallel with the three-phase bridge, the method comprising:
   providing an AC power supply;
   triggering the thyristors when the AC power supply provides a positive voltage;
   upon reversal of voltage polarity, automatically causing the free wheeling diode to conduct; and detecting a failure condition in which gain is excessive and results in oscillation between minimum and maximum firing angles.

5. A method for converting AC voltage to a DC voltage using six thyristors forming a three-phase bridge adapted to provide a variable voltage output and a free wheeling diode de-excitation mechanism connected in parallel with the three-phase bridge, the method comprising:

providing an AC power supply an inductive element;

triggering the thyristors when the AC power supply provides a positive voltage;

upon reversal of voltage polarity, depleting the inductive energy of the inductive element thereby causing a substantial portion of generator field current to discharge through the free wheeling diode, wherein after polarity reversal and prior to discharge of the inductive element, an insubstantial current discharges through the free wheeling diode; and detecting and unstable mode using steps comprising calculating a junction temperature of the free-wheeling diode.

6. A method for converting AC voltage to a DC voltage using six thyristors forming a three-phase bridge adapted to provide a variable voltage output and a free wheeling diode de-excitation mechanism connected in parallel with the three-phase bridge, the method comprising:

providing an AC power supply and an inductive element;

triggering the thyristors when the AC power supply provides a positive voltage;

upon reversal of voltage polarity, depleting the inductive energy of the inductive element thereby causing a substantial portion of generator field current to discharge through the free wheeling diode, wherein after polarity reversal and prior to discharge of the inductive element, an insubstantial current discharges through the free wheeling diode; and detecting a failure condition in which gain is excessive and results in oscillation between minimum and maximum firing angles.

7. A circuit for use in a synchronous generator excitation system, the circuit comprising:

a three-phase bridge having three legs, the three-phase bridge being connectable with an AC power supply:

a first thyristor and a second thyristor in each of the three legs, wherein the first thyristor and the second thyristor provide a path for a device current;

a de-excitation means connected in parallel with the three-phase bridge, the de-excitation means comprising a discharge path including a free wheeling diode positioned to provide a discharge path for a field current; and means for detecting a failure condition in which gain is excessive and results in oscillation between minimum and maximum firing angles.

8. The circuit of claim 7, wherein the free wheeling diode provides a discharge path for the field current when the polarity of a field voltage reverses.

9. The circuit of claim 7, wherein the device current flows until energy stored in an inductance of an input transformer associated with the AC power supply is depleted.

10. The circuit of claim 9, wherein the field current is discharged through the free wheeling diode when the inductive energy of the input transformer is depleted.

11. The circuit of claim 7, wherein the three-phase bridge has an output voltage of: $V_{out}=V\_ceiling*\cos(\alpha)$, where V_ceiling is a maximum voltage and $\alpha$ is the firing angle, for firing angles greater than or equal to zero degrees and less than or equal to sixty degrees.

12. The circuit of claim 11, wherein the three-phase bridge has an output voltage of $V_{out}=V\_ceiling*((1+\cos(\alpha+60))$ for a firing angle of greater than sixty degrees.

13. The circuit of claim 7, wherein substantial current flows in the free wheeling diode at a firing angle larger than seventy degrees.

14. The circuit of claim 7, wherein at a firing angle of sixty degrees, the free wheeling diode begins to conduct.

15. The circuit of claim 12, wherein the free wheeling diode conducts field current given up by two conducting thyristors.

16. The circuit of claim 12, wherein insubstantial current flows through the free wheeling diode at a firing angle of less than sixty degrees.

17. The circuit of claim 16, wherein the three phase bridge as an output voltage of $V_{out}=V\_ceiling*\cos(\alpha)$ for firing angles of less than or equal to 60 degrees and an output voltage of $V_{out}=V\_ceiling*(1+\cos(\alpha+60))$ for firing angles of greater than 60 degrees.

18. A method for converting an AC voltage to a DC voltage using six thyristors forming a three-phase bridge adapted to provide a variable voltage output and a free wheeling diode de-excitation mechanism connected in parallel with the three-phase bridge, the method comprising:

providing an AC power supply and an inductive device;

A triggering the thyristors when the AC power supply provides a positive voltage;

upon reversal of voltage polarity, automatically causing the free wheeling diode to conduct; and depleting the inductive energy of the inductive device thereby causing a substantial portion of generator field current to automatically discharge through the free wheeling diode, wherein after polarity reversal and prior to discharge of the inductive device, an insubstantial current discharges through the free wheeling diode.

19. The method of claim 18 wherein insubstantial current discharges through the free wheeling diode at a firing angle of sixty degrees.

20. The method of claim 18 wherein the step of causing a substantial amount of generator current to flow in the free wheeling diode occurs at a firing angle larger than seventy degrees.

21. A method for converting AC voltage to a DC voltage using six thyristors forming a three-phase bridge adapted to provide a variable voltage output and a free wheeling diode de-excitation mechanism connected in parallel with the three-phase bridge, the method comprising:

providing an AC power supply and an inductive element;

triggering the thyristors when the AC power supply provides a positive voltage; and upon reversal of voltage polarity, depleting the inductive energy of the inductive element thereby causing a substantial portion of generator field current to discharge through the free wheeling diode, wherein after polarity reversal and prior to discharge of the inductive element, an insubstantial current discharges through the free wheeling diode.

22. The method of claim 21, wherein the step of causing a substantial amount of generator current to flow in the free wheeling diode occurs a firing angle larger than seventy degrees.

23. The method of claim 21, wherein insubstantial current discharges at a firing angle of sixty degrees.

24. A method for converting an AC voltage to a DC voltage using six thyristors forming a three-phase bridge and a free wheeling diode de-excitation mechanism connected in parallel with the three-phase bridge, the method comprising:

provides an AC power supply;

triggering the thyristors when the AC power supply provides a positive voltage;

upon reversal of voltage polarity, automatically causing the free wheeling diode to conduct; and detecting an unstable mode of operation using steps comprising calculating a junction temperature of the free-wheeling diode.

* * * * *